United States Patent
Gangadharan et al.

(10) Patent No.: US 8,533,647 B1
(45) Date of Patent: Sep. 10, 2013

(54) METHOD FOR GENERATING AN INTEGRATED AND UNIFIED VIEW OF IP-CORES FOR HIERARCHICAL ANALYSIS OF A SYSTEM ON CHIP (SOC) DESIGN

(71) Applicant: Atrenta, Inc., San Jose, CA (US)

(72) Inventors: Sridhar Gangadharan, San Jose, CA (US); Mohammad H. Movahed-Ezazi, Saratoga, CA (US); Shaker Sarwary, San Diego, CA (US); Fadi Maamari, San Jose, CA (US); Subir Subir Ray, San Jose, CA (US)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/645,897

(22) Filed: Oct. 5, 2012

(51) Int. Cl.
G06F 17/50 (2006.01)

(52) U.S. Cl.
USPC .......................................... 716/112; 716/111

(58) Field of Classification Search
USPC .................................................. 716/110–115
See application file for complete search history.

(56) References Cited

U.S. PATENT DOCUMENTS

| | | | |
|---|---|---|---|
| 6,427,224 B1 | 7/2002 | Devins et al. | |
| 6,487,699 B1 | 11/2002 | Devins et al. | |
| 6,539,522 B1 | 3/2003 | Devins et al. | |
| 6,571,373 B1 | 5/2003 | Devins et al. | |
| 6,615,167 B1 | 9/2003 | Devins et al. | |
| 6,757,882 B2 | 6/2004 | Chen et al. | |
| 6,865,502 B2 | 3/2005 | Devins et al. | |
| 7,100,133 B1 | 8/2006 | Meiyappan et al. | |
| 7,219,265 B2 | 5/2007 | Yee | |
| 7,353,131 B2 | 4/2008 | Devins et al. | |
| 7,568,141 B2 | 7/2009 | Menon et al. | |
| 7,607,057 B2 | 10/2009 | Boike et al. | |
| 7,607,116 B2 | 10/2009 | Kwon | |
| 7,657,854 B2 | 2/2010 | Goel et al. | |
| 7,729,877 B2 | 6/2010 | Devins et al. | |
| 8,028,209 B2 | 9/2011 | Li et al. | |
| 8,051,347 B2 | 11/2011 | Varadarajan et al. | |
| 2005/0144577 A1 | 6/2005 | Devins et al. | |
| 2005/0204233 A1 | 9/2005 | Shin et al. | |
| 2005/0289485 A1 | 12/2005 | Willis | |
| 2006/0123370 A1* | 6/2006 | Vergara-Escobar | 716/6 |
| 2006/0156100 A1 | 7/2006 | Boike et al. | |
| 2007/0016880 A1 | 1/2007 | Brinson et al. | |
| 2007/0136047 A1 | 6/2007 | Newman et al. | |
| 2007/0204246 A1 | 8/2007 | Devins et al. | |
| 2008/0034261 A1 | 2/2008 | Birmiwal et al. | |
| 2008/0127021 A1 | 5/2008 | Goel et al. | |
| 2008/0163143 A1 | 7/2008 | Kwon | |
| 2008/0244491 A1* | 10/2008 | Ganesan et al. | 716/10 |
| 2008/0313583 A1 | 12/2008 | Brinson et al. | |
| 2010/0017656 A1 | 1/2010 | Park et al. | |
| 2010/0023807 A1 | 1/2010 | Wu et al. | |
| 2010/0332177 A1 | 12/2010 | Wu et al. | |
| 2011/0145909 A1 | 6/2011 | Rachakonda et al. | |
| 2012/0143583 A1 | 6/2012 | Huang et al. | |

\* cited by examiner

*Primary Examiner* — Binh Tat
(74) *Attorney, Agent, or Firm* — Sughrue Mion, PLLC

(57) ABSTRACT

In order to realize some of the advantages described above, there is provided a computer-implemented method for verification of an intellectual property (IP) core in a system-on-chip (SoC). The method comprises generating a plurality of verification specific abstracted views of the IP core each of the plurality of verification specific abstracted views having a plurality of verification specific attributes at an input/output (I/O) interface of each of the abstracted view of the IP-core. A unified abstracted view of the IP-core is generated.

12 Claims, 4 Drawing Sheets

METHOD FOR GENERATING AN INTEGRATED AND UNIFIED VIEW OF IP-CORES FOR HIERARCHICAL ANALYSIS OF A SYSTEM ON CHIP (SOC) DESIGN

TECHNICAL FIELD

The current application relate to verification and test of integrated circuit (IC) designs and specifically to using hierarchical methods for reducing the resources, time, and cost, for verification of large silicon-on chip (SoC) integrated circuit designs.

BACKGROUND

As the size and complexity of the integrated circuit (IC) has grown over the years, chip design, testing and verification have also become complex. This is especially true as whole systems having partitions with multiple functionalities are integrated into the IC to form a system-on-chip (SoC). In a typical multifunctional SoC, the functional blocks comprise any and all of the likes of processor cores, clock trees, a variety of memory types, such as but not limited to, dynamic random access memories (DRAMs), Static random access memories (SRAMs), non-volatile memories (NVMs), interface logic, communication modules, control logic, input and output (I/O) modules, multiple power distribution networks and all necessary interconnects and busses to integrate them together.

Typically a SoC is designed as multiple levels of two or more interconnected functional blocks each with a number of intellectual property cores (IP-cores) instantiated. As design size increases it is becoming impossible to read an entire SoC as a flat design into a computer aided design (CAD) system to perform design verifications. To read in the SoC it is necessary to read the top level connections of the functional blocks of IP-cores as well as the lower levels of the design with all hierarchically instantiated IP-cores below. This means reading in the hierarchy within the top level functional blocks which might have additional hierarchical functional blocks or IP-cores within it. Also todays SoC, in all probability, will be a functional block or an IP-core within a future SoC design. So the complexity of the structure increases continuously. The size and complexity hence make it difficult to read in all the IP-cores and run verification as a flat design within available time, cost and resource constraints that are available.

FIG. 1 is an exemplary and non-limiting block diagram 100 of an IP-core 101. The IP-core 100 can have one or more inputs 102 {1 to n}, one or more clocks 103 {1 to m}, and one or more outputs 104 {1 to p}. The internal circuit of IP-core 101, defined by resistor transistor logic (RTL), generates, using the clocks 103 and other inputs 102 provided, the output 104 of the IP-core 100.

The uses of third-party IP-cores, within the SoC designs, have further complicated the integration process. These IP-cores, though tested, characterized and verified as standalone circuits, do not often behave in a way the designer expects when integrated into a SoC. Verification of the SoC design implementations using full chip verification methods, similar to those used for the IP-cores, enable capture and correction of problems associated with the design. But the size of the SoCs, typically over 200 million gates having highly complex designs, with multiple functionalities, both analog and digital components built-in, and third party IP-cores have made the task difficult as discussed earlier.

The issues of SoC integration are further compounded by the fact that, in many instances, while the designer is knowledgeable of the external functionality of an IP-core, the designer is left with limited or little to no knowledge of the internal functionality of the purchased IP-cores, which are provided as gray boxes. This means that only the functionality of the IP-core is provided with little or no information on the internal circuitry itself used within the IP-core. Hence clock domain crossing (CDC), structural connectivity (SC), design for test (DFT), timing closure (TC) issues etc. within the IP-core are not open or disclosed to the SoC designer. This can result in unwanted and unexpected operational glitches and failure modes in the completed SoC design with these IP-cores. Further the designers of IP-cores are not completely aware of the conditions under which these IP-cores are instantiated in the SoCs.

The prior art verification options, where all internal circuits are brought to the level to be checked, as a flattened design, are not viable for these new large complex SoCs. Hence, large SoCs of today are tested using a block based methodology where blocks are verified individually. These are then instantiated in the SoC to enable top level connectivity and subsystem level functional testing. The overall reliability of the SoC is assessed from the subsystem testing results assuming proper constraint matching at the integration level. The tests and verification for design functionality and coverage at SoC level during design are minimized leaving the design with an increased probability for higher level issues, within the SoC design, due to integration relating to problems of functionality, power management (PM), clock domain crossing (CDC) etc.

It would be advantageous to provide a computer-implemented method for full chip test and verification of large SoC designs, in a hierarchical implementation, that take care of all the constraints of the subsystems and IP-cores used within the SoC. It would be further advantageous if the method would allow running of all the different verification types on the same hierarchical SoC design with acceptable time and resource usage.

SUMMARY

In order to realize some of the advantages described above, there is provided a computer-implemented method for verification of an intellectual property (IP) core in a system-on-chip (SoC). The method comprises generating a plurality of verification specific abstracted views of the IP core each of the plurality of verification specific abstracted views having a plurality of verification specific attributes at an input/output (I/O) interface of each of the abstracted view of the IP-core. A unified abstracted view of the IP-core is generated.

Specifically, the unified abstracted view of the IP core is generated using a process comprising tagging each said plurality of verification specific attributes with a tag that is verification specific, to enable identification of each said attribute with corresponding said verification specific abstracted view and said verification type. Each of the plurality of attributes from said plurality of verification specific abstracted views is compared. Based on the comparison, a first output set containing groups of redundant attributes that have at least two similar attributes with different tags generated. Based on the comparison a second output set containing a group of unique attributes, each with a single verification specific tag is generated. One tagged attribute is selected as a retained attribute from each of the redundant group of. Attributes. All tags from the redundant group of attributes are attached to the retained attribute. All unselected attributes are deleted. First output set with the group of unique retained attributes with multiple tags is combined with the second set with the group of unique attributes with single tags thereby creating a unified group of attributes. The combined unified groups of attributes are integrated with the IP-core.

More specifically, the unified abstracted view of the IP-core is used in a verification system for verification of the SoC design using any one or more of a verification program types.

More specifically, the unified abstracted view contains information on combinatorial paths with the IP-core, the boundary registers with clock information, clock domain information and constraints applied to the IP-core.

More specifically, the unified abstracted view contains polarity of paths between inputs and outputs and input to boundary registers and boundary registers to with all associated constraints on the paths.

In another specific enhancement, for generating the abstracted view, the RTL implementation of the IP core is provided as an input.

More specifically, the generation of the abstracted view, block level constraints that include block level assumptions for input and block level assumptions for output for the IP-core are provided.

Another aspect of the disclosed teachings is a system for verification of an intellectual property (IP) core in a system-on-chip (SoC). The system comprises a first input that provides an RTL implementation of the IP core. A second input provides block level constraints that include block level input assumptions and block level output assumptions for the verification type of the IP core. An abstraction generator generates a plurality of verification specific abstracted views of the IP core each said plurality of verification specific abstracted views having a plurality of verification specific attributes at an input/output (I/O) interface of each said abstracted view of the IP-core. The abstraction generator further generates a unified abstracted view of the IP-core.

Specifically, unified abstracted view of the IP-core is used in a verification system for verification of the SoC design using any one or more of a verification program types.

More specifically, the unified abstracted view contains information on combinatorial paths with the IP-core, the boundary registers with clock information, clock domain information and constraints applied to the IP-core.

Still more specifically, the unified abstracted view contains polarity of paths between inputs and outputs and input to boundary registers and boundary registers to with all associated constraints on the paths.

Yet another aspect of the disclosed teachings is a computer program product including tangible computer readable medium comprising instructions for enabling a computer to implement the methods and systems described above.

BRIEF DESCRIPTION OF THE DRAWINGS

The subject matter that is regarded as the invention is particularly pointed out and distinctly claimed in the claims at the conclusion of the specification. The foregoing and other objects, features, and advantages of exemplary embodiments of the invention will be apparent from the following detailed description taken in conjunction with the accompanying drawings.

DETAILED DESCRIPTION

System-on-chip (SoC) integrated circuits comprise a collection of intellectual property (IP) cores from multiple vendors integrated with cores designed in-house. The SoCs can reach well over 200 million interconnected gates. Even when the IP-cores have been tested, verified and characterized individually, they rarely function as planned when integrated into the SoCs. Running multiple types of verifications of large SoCs, with all IP-cores has become impractical as it is time and resource intensive. A computer-implemented method for hierarchical verification using abstracted views of the IP-cores is disclosed where each abstracted view and associated attributes are identified to a verification type with a unique tag. Further disclosed is a method for generation of unified abstracted view of each IP-core using these identification tags. The use of unified abstracted views, of IP-cores, allows SoC verification for a plurality of the verification types that include structural-connectivity (SC) verification, clock-domain-crossing (CDC), design-for-testability (DFT), power-management (PM) and timing-closure (TC).

A computer program product is provided that contains a plurality of instructions embedded in a non-transitory computer readable medium. The program product when executed by a computing device causes the computing device to execute a method for generation of verification specific abstracted views of each IP-core, which are then used by the program product in a continuing or separate execution of the program product to generate a unified abstracted view of the IP-core. This unified abstracted view is usable by all the specified verification programs. A system typically comprising a processing unit and a memory communicably coupled to the processing unit is used for the purpose. The memory stores all design files for IP-core and instructions for enabling the processing unit to perform the necessary generation and integration functions to produce the abstracted views and the unified abstracted view of the IP-core. The details of the generation and integration are described in detail below.

Figure 1:
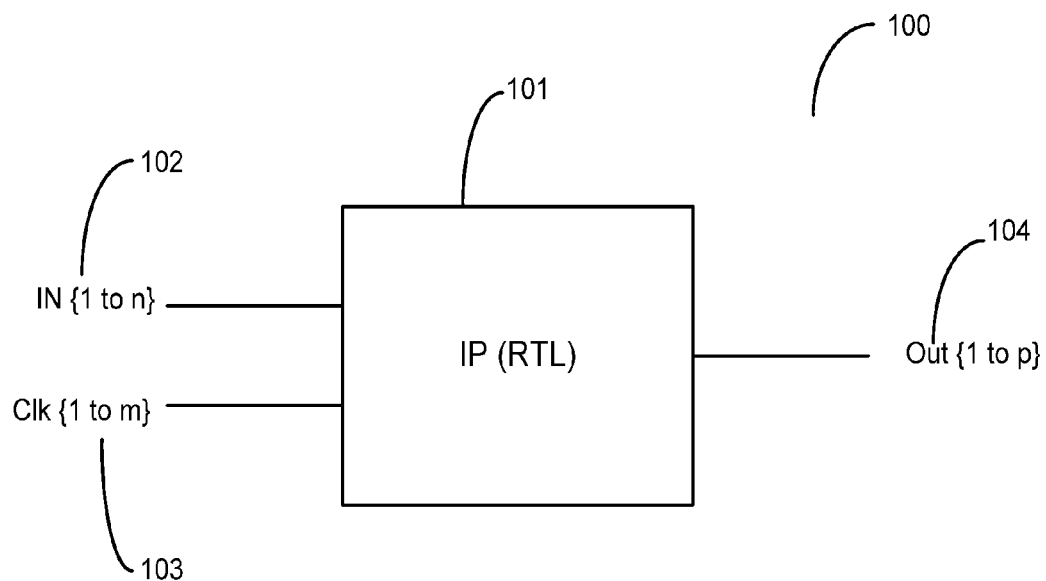
FIG. 1—is a block diagram of an IP-core (Prior Art)
Figure 2:
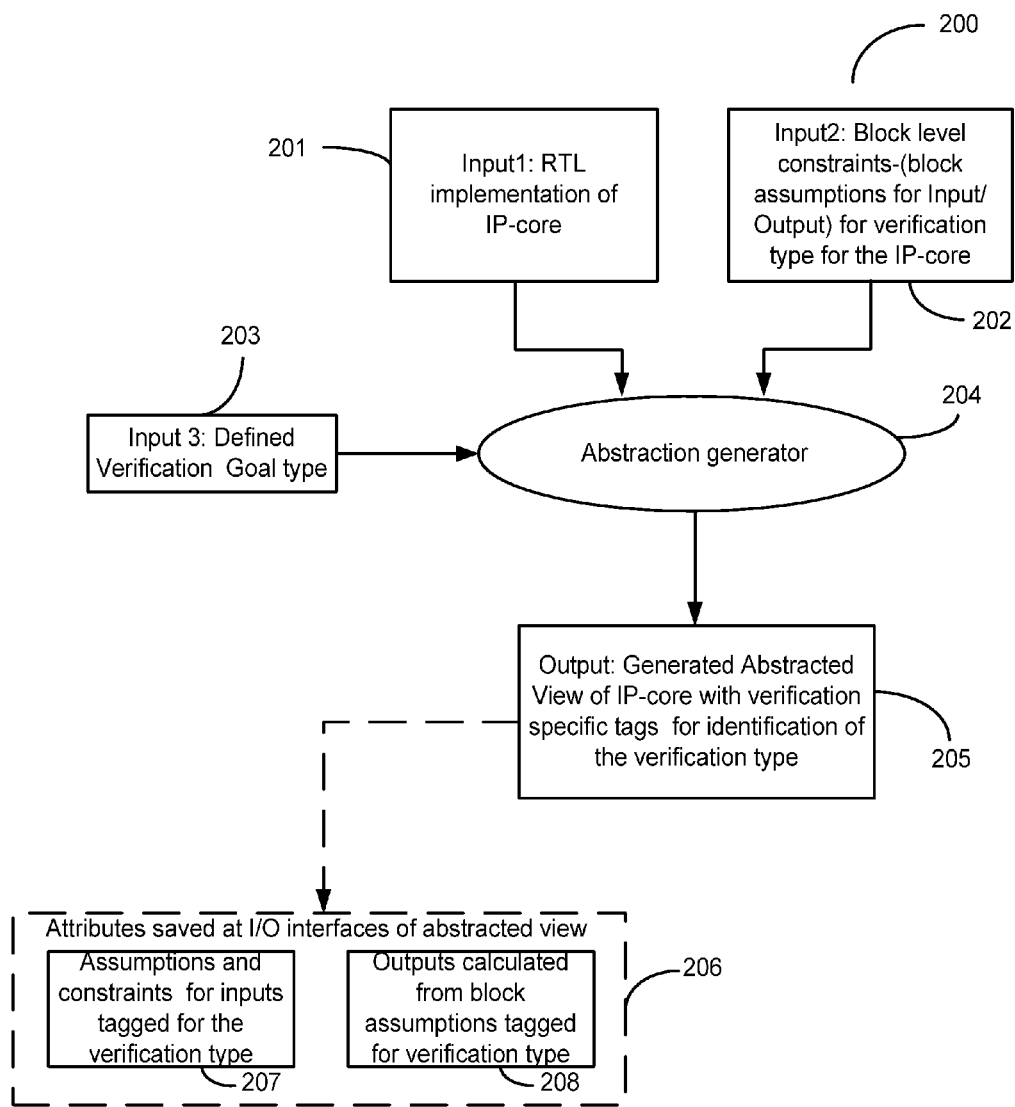
FIG. 2—is a block diagram of an exemplary embodiment of a system, showing inputs and outputs, for the creation of an abstracted view of an IP-core tagged for identification and use with a specific verification type.

FIG. 2 is an exemplary and non-limiting diagram 200 of the system, with the inputs and outputs shown, for the creation of an abstracted view 205 of an IP-core 100, with attributes tagged for each verification type, using an abstraction generator 204. The abstracted view is a representative model of an IP-core that contains the relevant information needed for verification at a higher level of the SoC design. The abstracted view contains information on combinatorial paths within the IP-core, the boundary registers with clock set/reset information, clock domain information and constraints applied to the IP-core execution. The abstracted view also contains the polarity of paths between inputs and outputs, input to boundary registers and boundary registers to output with all associated constraints on these paths. The RTL 101 of the IP-core 100 is provided as a first input 201 to the abstraction generator 204. The block level constraints that include block assumptions for input 102 and block assumptions for output 103 for the IP-core 100 are supplied as a second input 202 to the abstraction generator 204. The block level assumptions and constraints input 202 comprise the details of the input and output (I/O) interface of the IP-core 100. This includes information on the ports of the IP-core 100, such as port type, width and direction as well as associated constraints that mimic the conditions under which the block is instantiated within the SoC. A goal-set that includes information on the type of verification such as anyone of CDC, DFT, TC, SC, etc. for which the abstracted view is generated is provided as a third input 203 to the abstraction generator 204. The abstracted view generation 205 of the IP-core 100 is performed with the three inputs 201-203. The abstracted view 205, for the verification type, is generated and is output by the abstraction generator 204. This abstracted view 205 is a gray-box model of the IP-core 100 that has all the attributes 206 with necessary constraints imposed for the type of verification to be done, at the periphery or interface of the abstracted view 205. The attributes 206 are tagged for identification of the specific verification type for which the abstracted view is generated. The attributes 206 that is output as part of the abstracted view 205 hence have one set of attributes 207 associated with the assumptions and constraints of the input block and a second set of attributes 208 derived from the interaction of the internal circuits 101 of the IP-core 100 with the inputs 202 provided for generation of the abstracted view 205. These attributes 206 that is output with and forming a part of the abstracted view 205 are associated with the appropriate input and outputs (I/O) interfaces of the abstracted view 205 of the IP-core 100. These attributes 206 are made part of the abstracted view 205 as tagged constraints, tagged for identification and use with the specific verification type with which the abstracted view 205 is useable. The abstracted view 205 having the associated attributes 206 are made accessible to the specific verification program during a verification run type for which the attributes and the abstracted view are tagged.

Figure 3:
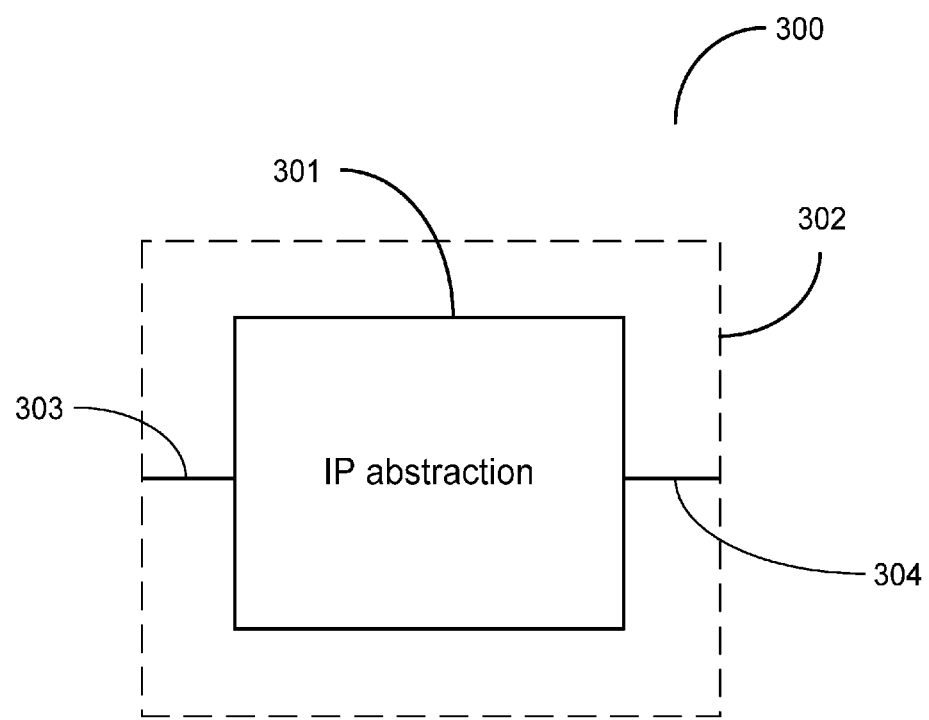
FIG. 3—is a block diagram an exemplary embodiment of the created abstracted view of the IP-core with attributes associated with the I/O interface.

FIG. 3 is an exemplary and non-limiting block representation of the abstracted view 300 of the IP-core 100. The abstracted view 300 of IP-core 100 is treated as an IP-abstraction gray-box 301 that has an I/O interface 302 with associated attributes 206 as constraints with tags indicating the verification type associated with it. The sets of tagged input assumptions and constraints 207 form a first set of constraints 303 associated with the abstracted view 300. The set of tagged outputs and assumptions 208 generated by the IP-core 100, for the inputs 207 provided for the verification goals, form a second set of constraints 304 associated with the abstracted view 300. When the specific verification of the SoC is performed, the abstracted view 300, having the attributes 206 with the correct identification tags, at the I/O interface 302 is substituted for the IP-core 100 within the SoC being verified. This eliminates the need for the verification program to go within and operate within the IP-core 100 as all necessary information for is available at the I/O interface to conduct and complete the SoC verification analysis of the selected type. The use of these abstracted views therefore reduces verification time, the resource usage, and as a result the cost of design verification as a whole.

In using the above types of abstraction for verification, there is need for a separate abstraction, for each IP-core for each type of verification, such as CDC, DFT, TC and SC verification etc. Each of these verification types has different constraints and input requirements. This leads to the generated abstracted views 300 of any IP-core having a different set of attributes 206 associated with them, for each of the different verification types, though there are some common attributes. The attributes of each abstracted view 300 are tagged with a tag that uniquely identify and associate the abstracted view 300 and its associated attributes 206 with a specific type of verification. This creates the need to keep a different abstracted view 300, of the same IP-core 100, for each verification type with their verification specific identification tags. Each type of verification run requires the right abstracted view 300 with the unique identification tag for that verification type to be input during a verification run. With the large number of IP-cores used in a SoC design, the choosing and use of specific abstracted view 300 of each IP-core, still is a confusing and error prone procedure. This also increases the manual involvement, time and complexity of SoC verification. A consolidated or unified abstracted view of the IP-core 100, usable for multiple verification types is able to further reduce the cost and complexity of the testing and verification of the SoC design. This integration of the generated abstracted views, one for each verification type, of an IP-core 100 into a single unified abstracted view is part of the current invention. The unified abstracted view of the IP-core 100 enable the unified abstracted view of the IP-core 100 to be used for any and all of the verification types, such as TC, SC, DFT, and CDC.

Figure 4:
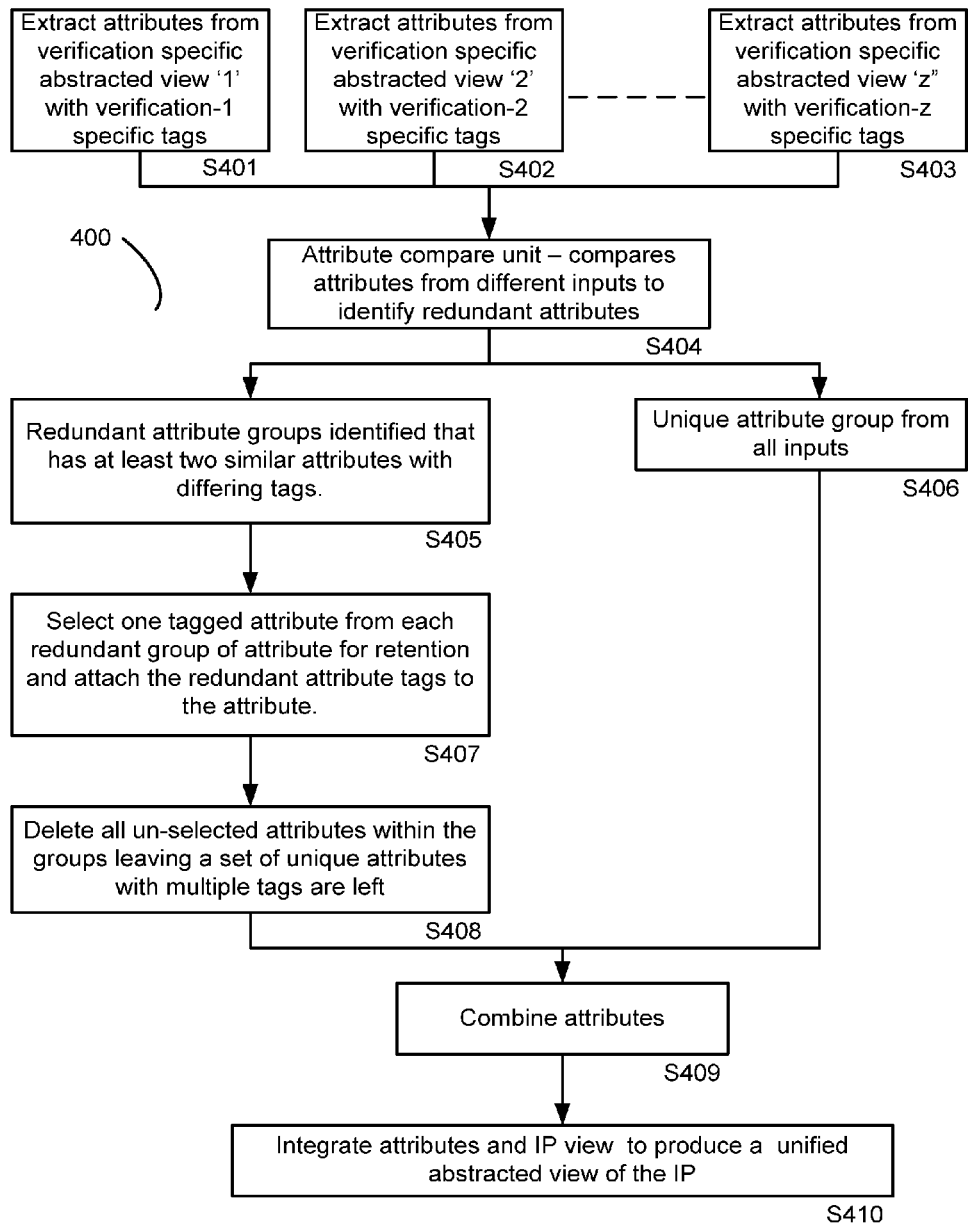
FIG. 4—is a flowchart of an exemplary embodiment of the creation of a unified and integrated abstracted view of an IP-core from two or more individual verification specific abstracted views of the IP-core.

FIG. 4 is an exemplary and non-limiting flowchart 400 of the formation of the unified abstraction of the IP-core 100 combining and integrating the attributes of individual abstracted views produced for different types of verifications.

The attributes tagged for specific verification type, such as verification 1 to verification 'z', where 'z' is an integer equal to the number of verification types but is equal or greater than 2, are extracted to form attribute sets from the abstracted views. S401, S402 and S403.

These attribute sets are input into an attribute comparing unit and each attribute of each input attribute set is compared with all the attributes of the other sets. S404.

The attribute comparison identifies and produces a first set of redundant attribute groups where each attribute of a group has at least one redundant attribute in another input attribute set, but with a different tag, indicating that the redundant attribute is from an abstracted view for a different verification type. S405.

The comparison unit produces a second set of attribute where each attribute is unique within the input sets of attributes, each unique attribute having only a single instance within the input attribute sets with a tag corresponding to only one of the specific verification types. S406.

Remove the redundant attributes from each group within the first set of redundant attributes, leaving each of the redundant groups with only a single attribute. S407.

Associate the tags from the removed attributes of each redundant attribute group to the remaining attribute of the group, producing an attribute with multiple tags from each group of redundant attributes. The attribute with multiple tags is enabled for use with any of the specific verification sets for which one of associated tags is applicable. This process step converts the first set of redundant attribute groups to a set having unique attributes with multiple tags. S408

The set of unique attributes with multiple tags generated at S408 are combined with the unique attributes set with single tags generated at S406 to produce a combined attribute group that has all unique attributes, some with multiple tags and some with single tags. S409.

The combined attributes are now integrated into I/O interface of the black box structure of the IP-core 100 to produce an integrated and unified abstracted view of the IP-core 100. S410

This single unified abstracted view of the IP-core 100 is now useable with all the verification programs for which separate abstracted views were defined and attributes extracted for use as inputs to the attribute comparing unit in step S404.

During verification runs the different verification programs are enabled to choose all the attributes of the unified abstracted views of the IP-cores used that have the specific verification program type tags associated with them. This selectivity enables the verification programs to be efficient in use of the processing resources for the use of unified abstracted view of IP-cores used.

Further examples of the abstraction process can be found in SpyGlass® 4.7.0, SpyGlass SoC Methodology, Atrenta Inc., the contents of which are incorporated herein by reference.

Abstracting IP-cores is intended to reduce the size of the analysis and improve the speed and efficiency of SoC verification. All IP-cores are not good candidates for abstraction. Abstracting small IP-cores do not provide appreciable improvement in performance while very large IP-cores or functional blocks with multiple levels of hierarchy, if used for abstraction as a single IP-core, will take long time and can be very complex. In current practice IP-cores having five million or more gates are found to be good candidates for generation of hierarchical abstracted views. These abstracted views can then be used in larger IP-cores or functional blocks to generate an upper level hierarchical IP-core to be instantiated into a SoC. A substantial improvement in verification performance in terms of time, memory and other resource usage, have been seen when using unified abstraction views of internal IP-cores. With about 25% of the IP-cores used, in large designs over 200 million gates, converted to unified abstracted views, the verification performance improvement is dramatic, with as much as 50% reduction in resource usage seen in some cases. The improvement increases as more and more IP-cores within the design are replaced in the verification by unified abstracted views of the respective IP-cores. Hence this hierarchical method provides a viable way to reduce time, resource usage and cost of SoC design verification.

These abstractions of the blocks once generated and stored, can be reused in other SoCs with no modification as long as long as the assumptions used in the generation of the constraints remain the same.

A person skilled-in-the-art would readily appreciate that the invention disclosed herein is described with respect to specific embodiments that are exemplary. However, this should not be considered a limitation on the scope of the invention. Specifically, other implementations of the disclosed invention are envisioned and hence the invention should not be considered to be limited, to the specific embodiments discussed herein above. The invention may be implemented on processors, test systems, verification systems, or a combination of the above. The invention may also be implemented as a software program stored in a non-tangible memory module, the instructions of which to be executed on a processor, a combination of integrated software and hardware or as emulation on hardware, including but not limited to a computer aided design (CAD) system. The invention should not be considered as being limited in scope based on specific implementation details, but should be considered on the basis of current and future envisioned implementation capabilities.

What is claimed is:

1. A computer-implemented method for verification of an intellectual property (IP) core in a system-on-chip (SoC), the method comprising:
    generating a plurality of verification specific abstracted views of the IP core each said plurality of verification specific abstracted views having a plurality of verification specific attributes at an input/output (I/O) interface of each said abstracted view of the IP-core;
    and
    generating a unified abstracted view of the IP-core, wherein the unified abstracted view of the IP core is generated using a process comprising:
    tagging each said plurality of verification specific attributes with a tag that is verification specific, to enable identification of each said attribute with corresponding said verification specific abstracted view and said verification type;
    comparing each said plurality of attributes from said plurality of verification specific abstracted views;
    generating from said comparing a first output set containing groups of redundant attributes that have at least two similar attributes with different tags,
    generating from said comparing a second output set containing a group of unique attributes, each with a single verification specific tag;
    selecting one tagged attribute as a retained attribute from each of the redundant group of
    attributes and attaching all tags from the redundant group of attributes to the retained attribute;
    deleting all unselected attributes;
    combining said first output set with said group of unique retained attributes with multiple tags with said second set with said group of unique attributes with single tags thereby creating a unified group of attributes;
    integrating said combined unified groups of attributes with the IP-core,
    wherein at least one of the steps is performed using the computer.

2. The method of claim 1, further comprising using the unified abstracted view of the IP-core in a verification system for verification of the SoC design using any one or more of a verification program types.

3. The method of claim 1, wherein the unified abstracted view contains information on combinatorial paths with the IP-core, the boundary registers with clock information, clock domain information and constraints applied to the IP-core.

4. The method of claim 3, wherein the unified abstracted view contains polarity of paths between inputs and outputs and input to boundary registers and boundary registers to with all associated constraints on the paths.

5. The method of claim 1, wherein for generating the abstracted view, the RTL implementation of the IP core is provided as an input.

6. The method of claim 1, wherein for the generation of the abstracted view, block level constraints that include block level assumptions for input and block level assumptions for output for the IP-core are provided.

7. A computer program product including a non-transitory computer medium, the medium comprising instructions to enable a computer to implement a method for verification of an intellectual property (IP) core in a system-on-chip (SoC), the method comprising:
    generating a plurality of verification specific abstracted views of the IP core each said plurality of verification specific abstracted views having a plurality of verification specific attributes at an input/output (I/O) interface of each said abstracted view of the IP-core;
    and
    generating a unified abstracted view of the IP-core wherein the unified abstracted view of the IP core is generated using a process comprising:
    tagging each said plurality of verification specific attributes with a tag that is verification specific, to enable identification of each said attribute with corresponding said verification specific abstracted view and said verification type;
    comparing each said plurality of attributes from said plurality of verification specific abstracted views;

generating from said comparing a first output set containing groups of redundant attributes that have at least two similar attributes with different tags, generating from said comparing a second output set containing a group of unique attributes, each with a single verification specific tag;

selecting one tagged attribute as a retained attribute from each of the redundant group of attributes and attaching all tags from the redundant group of attributes to the retained attribute;

deleting all unselected attributes;

combining said first output set with said group of unique retained attributes with multiple tags with said second set with said group of unique attributes with single tags thereby creating a unified group of attributes;

integrating said combined unified groups of attributes with the IP-core.

8. The computer program product of claim 7, wherein the method further comprises using the unified abstracted view of the IP-core in a verification system for verification of the SoC design using any one or more of a verification program types.

9. The computer program product of claim 7, wherein the unified abstracted view contains information on combinatorial paths with the IP-core, the boundary registers with clock information, clock domain information and constraints applied to the IP-core.

10. The computer program product of claim 9, wherein the unified abstracted view contains polarity of paths between inputs and outputs and input to boundary registers and boundary registers to with all associated constraints on the paths.

11. The computer program product of claim 7, wherein for generating the abstracted view, the RTL implementation of the IP core is provided as an input.

12. The computer program product of claim 7, wherein for the generation of the abstracted view, block level constraints that include block level assumptions for input and block level assumptions for output for the IP-core are provided.

* * * * *

UNITED STATES PATENT AND TRADEMARK OFFICE
CERTIFICATE OF CORRECTION

PATENT NO. : 8,533,647 B1  
APPLICATION NO. : 13/645897  
DATED : September 10, 2013  
INVENTOR(S) : Sridhar Gangadharan et al.

Page 1 of 1

It is certified that error appears in the above-identified patent and that said Letters Patent is hereby corrected as shown below:

Title page, left column,

Delete "(72): Inventors: Sridhar Gangadharan, San Jose, CA (US);  
Mohammad H. Movahed-Ezazi, Saratoga, CA (US);  
Shaker Sarwary, Sand Diego, CA (US)  
Fadi Maamari, San Jose, CA (US)  
Subir Subir Ray, San Jose, CA (US)"

Insert --(72): Inventors: Sridhar Gangadharan, San Jose, CA (US);  
Mohammad H. Movahed-Ezazi, Saratoga, CA (US);  
Shaker Sarwary, San Diego, CA (US)  
Fadi Maamari, San Jose, CA (US)  
Subir Ray, San Jose, CA (US)"--

Signed and Sealed this  
Nineteenth Day of August, 2014

Michelle K. Lee  
*Deputy Director of the United States Patent and Trademark Office*